US012578079B2

United States Patent

Xie

(12) United States Patent
(10) Patent No.: US 12,578,079 B2
(45) Date of Patent: Mar. 17, 2026

(54) COLOR-CHANGING LAMPSHADE AND LAMP

(71) Applicant: SHENZHEN AURORA TECHNOLOGY LIMITED, Shenzhen (CN)

(72) Inventor: Qingbo Xie, Shenzhen (CN)

(73) Assignee: SHENZHEN AURORA TECHNOLOGY LIMITED, Shenzhen (CN)

( * ) Notice: Subject to any disclaimer, the term of this patent is extended or adjusted under 35 U.S.C. 154(b) by 0 days.

(21) Appl. No.: 19/011,853

(22) Filed: Jan. 7, 2025

(65) Prior Publication Data

US 2025/0271120 A1 Aug. 28, 2025

(30) Foreign Application Priority Data

Feb. 26, 2024 (CN) ......................... 202420355033.7

(51) Int. Cl.

| | |
|---|---|
| ***F21V 9/40*** | (2018.01) |
| ***F21V 1/12*** | (2006.01) |
| ***F21V 7/00*** | (2006.01) |
| ***F21V 7/06*** | (2006.01) |
| ***F21V 17/06*** | (2006.01) |
| ***F21V 17/12*** | (2006.01) |
| ***F21V 31/00*** | (2006.01) |
| *F21Y 115/10* | (2016.01) |

(52) U.S. Cl.

CPC .................. *F21V 9/40* (2018.02); *F21V 1/12* (2013.01); *F21V 7/0083* (2013.01); *F21V 7/06* (2013.01); *F21V 17/06* (2013.01); *F21V 17/12* (2013.01); *F21V 31/005* (2013.01); *F21Y 2115/10* (2016.08)

(58) Field of Classification Search

CPC . F21V 9/40; F21V 1/12; F21V 7/0083; F21V 31/005

See application file for complete search history.

(56) References Cited

U.S. PATENT DOCUMENTS

| | | | | |
|---|---|---|---|---|
| 5,083,251 A * | 1/1992 | Parker | F21V 9/40 362/255 |
| 8,292,449 B2 * | 10/2012 | Poissonnet | F21V 25/12 362/267 |
| 11,059,416 B1 * | 7/2021 | Kulkarni | B60Q 1/1438 |
| 12,140,303 B1 * | 11/2024 | Hou | F21V 5/007 |
| 2009/0180281 A1 * | 7/2009 | Ahland, III | F21V 25/10 362/234 |

(Continued)

*Primary Examiner* — Tracie Y Green
*Assistant Examiner* — Michael Chiang
(74) *Attorney, Agent, or Firm* — Westbridge IP LLC

(57) ABSTRACT

Disclosed are a color-changing lampshade and a lamp. The color-changing lampshade includes an upper cover, a waterproof ring, a substrate and a color-changing coating. The upper cover encloses a light outlet. The substrate is a transparent component, and the substrate is provided with a first side and a second side opposite to the first side. The upper cover extends along the periphery of the substrate; the upper cover leans against the first side, and the upper cover presses the substrate against one side of the waterproof ring. The color-changing coating is provided corresponding to the position of the light outlet, and the color-changing coating is coated on the second side.

6 Claims, 4 Drawing Sheets

(56) References Cited

U.S. PATENT DOCUMENTS

| | | | | |
|---|---|---|---|---|
| 2015/0084541 | A1* | 3/2015 | Jung | H05B 45/395<br>315/291 |
| 2020/0226999 | A1* | 7/2020 | Wang | G02F 1/163 |
| 2021/0333470 | A1* | 10/2021 | Haring | G02B 6/0095 |
| 2023/0273494 | A1* | 8/2023 | He | G02F 1/1533<br>359/275 |
| 2024/0200769 | A1* | 6/2024 | Ahire | B64F 1/20 |

* cited by examiner

COLOR-CHANGING LAMPSHADE AND LAMP

CROSS-REFERENCE TO RELATED APPLICATIONS

The present application claims priority to Chinese Patent Application No. 202420355033.7, filed on Feb. 26, 2024, the entire contents of which are incorporated herein by reference.

TECHNICAL FIELD

The present application relates to the technical field of color-changing lamps, and in particular to a color-changing lampshade and a lamp.

BACKGROUND

In the related art, as people's living standards improve, people's demand for material culture is also developing in a diversified direction. When using lights for decoration and creating an atmosphere, it is often necessary to prepare many lampshades of different colors or multiple light sources of different colors. Therefore, when multiple colors of lights are needed in the same usage scenario, it is often necessary to replace lampshades of different colors, and use light sources of different colors or light cups of different colors to meet the usage needs.

However, the method of repeatedly replacing lampshades or light sources to meet the needs of different colors of lights is cumbersome, which increases the color change time of the light and makes the color change efficiency of the light low.

SUMMARY

The main purpose of the present application is to provide a color-changing lampshade and a lamp, aiming to solve the technical problem of low color-changing efficiency of the light caused by repeated replacement of the lampshade or light source in the related art.

To achieve the above purpose, the present application adopts the following technical solutions.

In the first aspect, the present application provides a color-changing lampshade, including:

an upper cover enclosing a light outlet;

a waterproof ring provided at intervals on one side of the upper cover and extending along a periphery of the upper cover;

a substrate, being a transparent component and provided with a first side and a second side opposite to the first side, wherein the upper cover is configured to extend along a periphery of the substrate, lean against the first side, and press the substrate against one side of the waterproof ring; and a color-changing coating provided corresponding to a position of the light outlet and coated on the second side.

In an embodiment, the color-changing coating is an electrochromic film.

In an embodiment, the color-changing coating is a thermosensitive color-changing layer.

In an embodiment, the color-changing coating is a photosensitive color-changing layer.

In the second aspect, the present application provides a lamp, including:

a lamp body radiator;

a light source; and the above-mentioned color-changing lampshade;

wherein a mounting cavity is formed in a recess on one side of the lamp body radiator, and the light source is mounted in the mounting cavity;

a light-emitting side of the light source is provided in a direction away from the lamp body radiator, and the upper cover is detachably mounted on the lamp body radiator;

the light outlet is provided corresponding to the light-emitting side of the light source;

the waterproof ring is provided on the lamp body radiator along a periphery of the mounting cavity, and the substrate is mounted on the mounting cavity corresponding to the light-emitting side of the light source; and an outgoing light emitted from the light-emitting side of the light source passes through the color-changing coating to form a color-changing light, and the color-changing light is emitted from the light outlet through the substrate.

In an embodiment, the upper cover is detachably mounted on the lamp body radiator by a plurality of bolts, and the plurality of bolts are provided at intervals along a circumference of the upper cover.

In an embodiment, the light source is a light emitting diode (LED) light panel.

In an embodiment, the lamp further includes:

a bracket, wherein the lamp body radiator is rotatably mounted on the bracket through a rotating shaft.

In an embodiment, the lamp further includes:

a reflective component mounted in the mounting cavity and provided between the light-emitting side of the light source and the substrate;

wherein the outgoing light emitted from the light-emitting side of the light source passes through the reflective component to form a reflected light;

the reflected light passes through the color-changing coating to form the color-changing light; and the color-changing light passes through the substrate and is emitted from the light outlet.

In an embodiment, the reflective component includes a mounting plate and a plurality of reflective cups distributed on the mounting plate, and a light-incoming end of each reflective cup is provided toward the light-emitting side of the light source.

The above one or more technical solutions provided by the present application can have the following advantages or at least achieve the following technical effects.

The present application proposes a color-changing lampshade and a lamp. By coating a color-changing coating on the substrate, while changing the light transmittance of the substrate, the substrate has the ability to change color. When multiple colors of lights are needed in the same usage scenario, the need can be met without replacing the lampshade, and using light sources of different colors or light cups of different colors, thereby avoiding the problem of the lampshade being easily loosened after assembly, and reducing the decoration cost generated by purchasing lampshades or light sources of multiple colors to meet the needs of lights of different colors. When changing the color of the light, there is no need to replace the lampshade or light source of multiple colors, which reduces the operation process of changing the color of the light, reduces the color change time of the light, and improves the color change efficiency of the light.

BRIEF DESCRIPTION OF THE DRAWINGS

In order to more clearly illustrate the embodiments of the present application or the technical solutions in the related art, the drawings required for use in the embodiments or the description of the related art will be briefly introduced below. Obviously, the drawings described below are only some embodiments of the present application. For persons skilled in the art, other drawings can be obtained based on the provided drawings without paying creative efforts.

Figure 1:
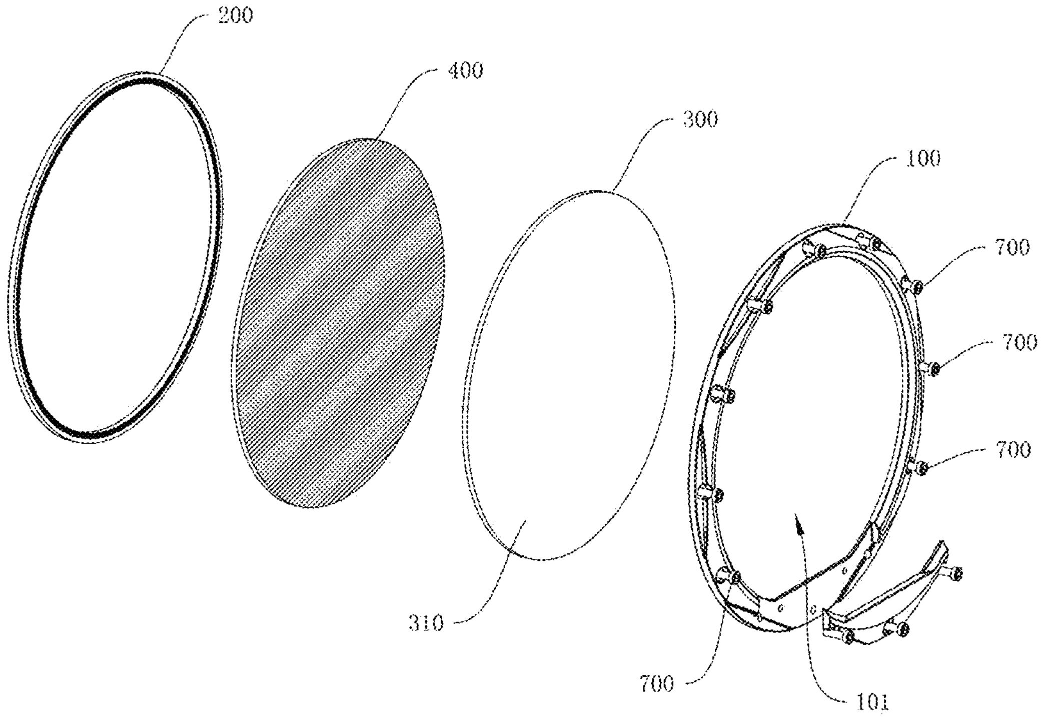
FIG. 1 is a schematic diagram of an exploded structure of a color-changing lampshade according to an embodiment of the present application.

The realization of the purpose, functional features and advantages of the present application will be further explained in conjunction with embodiments and with reference to the accompanying drawings.

DETAILED DESCRIPTION OF THE EMBODIMENTS

In order to make the purpose, technical solution and advantages of the present application clearer, the technical solution in the embodiment of the present application will be clearly and completely described below in conjunction with the drawings in the embodiment of the present application. Obviously, the described embodiment is only a part of the embodiment of the present application, not all the embodiments. Based on the embodiment of the present application, all other embodiments obtained by persons skilled in the art without creative efforts are within the scope of protection of the present application.

It should be noted that, in the embodiments of the present application, all directional indications (such as up, down, left, right, front, back . . . ) are only used to explain the relative position relationship, movement status, etc. between the components under a certain specific posture (as shown in the accompanying drawings). If the specific posture changes, the directional indication will also change accordingly.

In the present application, the terms "include", "comprise" or any other variants thereof are intended to cover non-exclusive inclusion, so that a process, method, article or system including a series of elements includes not only those elements, but also other elements not explicitly listed, or also includes elements inherent to such process, method, article or system. In the absence of further restrictions, an element defined by the sentence "include . . . " does not exclude the presence of other identical elements in the process, method, article or system including the element. In addition, the meaning of "and/or" appearing throughout the text includes three parallel schemes. Taking "A and/or B" as an example, it includes scheme A, or scheme B, or a scheme that satisfies both A and B.

In the present application, unless otherwise clearly specified and limited, the terms "connection", "fixation", etc. should be understood in a broad sense. For example, "connection" can be a fixed connection, a detachable connection, or an integral connection; it can be a mechanical connection or an electrical connection; it can be a direct connection or an indirect connection through an intermediate medium; it can be the internal connection of two elements or the interaction relationship between two elements.

In the present application, if there is a description involving "first", "second", etc., the description of "first", "second", etc. is only used for descriptive purposes and cannot be understood as indicating or implying its relative importance or implicitly indicating the number of the indicated technical features. Therefore, the features defined as "first" or "second" may explicitly or implicitly include at least one of the features.

In the present application, suffixes such as "module", "assembly", "part", "component" or "unit" used to represent elements are used only to facilitate the description of the present application and have no specific meaning. Therefore, "module", "component" or "unit" can be used interchangeably.

For persons skilled in the art, the specific meanings of the above terms in the present application can be understood according to specific circumstances. In addition, the technical solutions of various embodiments can be combined with each other, but this is based on the fact that persons skilled in the art can implement it. When the combination of technical solutions is contradictory or cannot be implemented, it should be considered that such combination of technical solutions does not exist and is not within the scope of protection required by the present application.

The technical concept of the present application is further described below in conjunction with some specific implementation methods.

The present application proposes a color-changing lampshade and a lamp.

Figure 2:
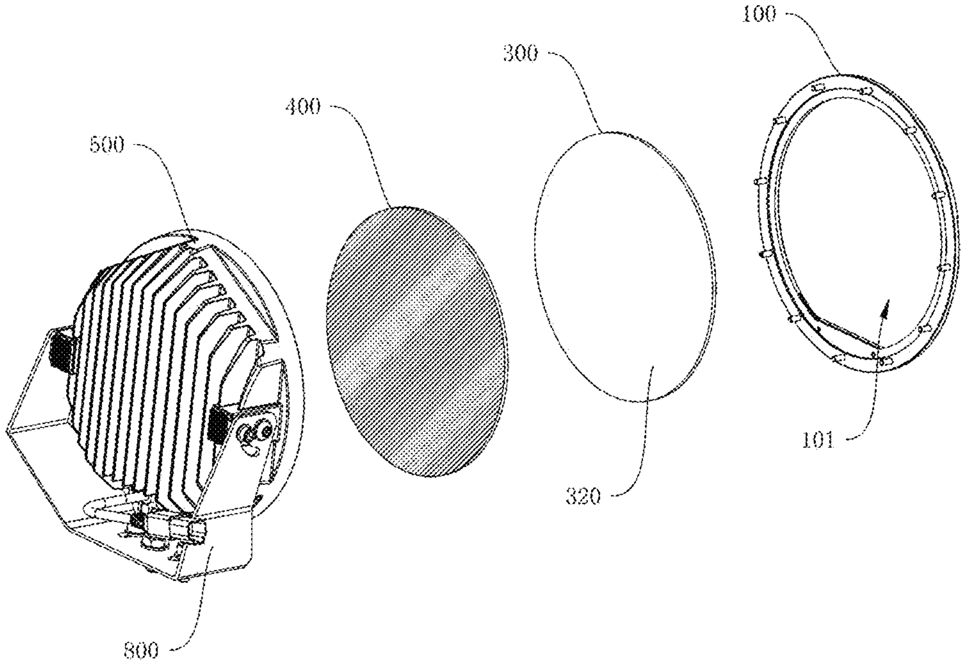
FIG. 2 is a schematic diagram of a structure of a second side according to an embodiment of the present application.

Referring to FIGS. 1 and 2, FIG. 1 is a schematic diagram of an exploded structure of a color-changing lampshade according to an embodiment of the present application, and FIG. 2 is a schematic diagram of a structure of a second side according to an embodiment of the present application.

In an embodiment of the present application, as shown in FIGS. 1 and 2, a color-changing lampshade includes an upper cover 100, a waterproof ring 200, a substrate 300 and a color-changing coating 400. The upper cover 100 encloses a light outlet 101. The waterproof ring 200 is provided at intervals on one side of the upper cover 100, and the waterproof ring 200 extends along a periphery of the upper cover 100. The substrate 300 is a transparent component, and the substrate 300 is provided with a first side 310 and a second side 320 opposite to the first side. The upper cover 100 extends along the periphery of the substrate 300; the upper cover 100 leans against the first side 310, and the upper cover 100 presses the substrate 300 against one side of the waterproof ring 200. The color-changing coating 400 is provided corresponding to the position of the light outlet 101, and the color-changing coating 400 is coated on the second side 320.

It should be noted that the upper cover 100 presses the substrate 300 on one side of the waterproof ring 200, and the color-changing coating 400 is coated on the second side 320, so that the color-changing coating 400 covers the side of the substrate 300 away from the upper cover 100, preventing the color-changing coating 400 from direct contact with the external environment, so as to ensure the service life of the color-changing coating 400. In order to ensure the light transmittance of the lampshade, the substrate 300 is a transparent polycarbonate (PC) board.

It should be understood that the color-changing coating 400 is used to present different colors, such as black, in different usage scenarios. It can be formed by an electrochromic film, thermosensitive paint or photosensitive paint in the related art. It presents one color in the presence of a light source 600 and another color in the absence of a light source 600, so as to meet the need to use lights of different colors for decoration or to create an environmental atmosphere in the same usage scenario.

It is worth noting that the color-changing lampshade can be applied to various lamps such as round lamps, long strip lamps, work lamps, etc.

The technical solution of the present application is to coat the color-changing coating 400 on the substrate 300, thereby changing the light transmittance of the substrate 300 and enabling the substrate 300 to have the ability to change color. When multiple colors of lights are needed in the same usage scenario, the need can be met without replacing the lampshade, and using light sources 600 of different colors or light cups of different colors, thereby avoiding the problem of the lampshade being easily loosened after assembly, and reducing the decoration cost generated by purchasing lampshades or light sources 600 of multiple colors to meet the needs of lights of different colors. When changing the color of the light, it is not necessary to replace the lampshade or light source 600 of multiple colors, thereby reducing the operation process of changing the color of the light, reducing the color change time of the light, and improving the color change efficiency of the light.

In an embodiment, the color-changing coating 400 is an electrochromic film.

It should be noted that the electrochromic film is an electrochromic film in the related art, which is a material with an electrochromic effect, and its characteristic is that it can change color under the action of an external electric field. This characteristic is caused by the rearrangement of charges inside the material, which changes the absorption spectrum of the material and thus presents different colors.

It should be understood that the electrochromic film can be formed on the substrate 300 by the related art such as physical vapor deposition, sputtering, and sol-gel method to form a color-changing coating 400.

It is worth noting that when the color-changing coating 400 is an electrochromic film, the color-changing coating 400 is connected to an external power source through a positive electrode lead and a negative electrode lead.

In an embodiment, when the color-changing coating 400 is not powered on, the color-changing lampshade is opaque, dark or matte, and when the color-changing coating 400 is powered on, the color-changing lampshade changes color.

Specifically, when the color-changing coating 400 is not powered, the color-changing lampshade is black when viewed from the front. When the light is turned on and the color-changing coating 400 is powered, the lampshade becomes transparent, and the light can shine normally. When the light is turned off and the color-changing coating 400 is powered off, the color-changing lampshade turns back to black, and the inside of the lamp body cannot be seen at a glance, so that the light source 600 is "hidden" to meet the color change demand.

In an embodiment, the degree of color change of the color-changing coating 400 is controlled by the magnitude of the current. After the color-changing coating 400 is powered on, the current flowing into the color-changing coating 400 is adjusted to change the color of the color-changing lampshade from dark to light or transparent.

In an embodiment, the degree of color change of the color-changing coating 400 is controlled by the magnitude of the current. After the color-changing coating 400 is powered on, the current flowing into the color-changing coating 400 is adjusted to change the color of the color-changing lampshade from light to dark, such as black, amber, brown, and other opaque colors. After the color-changing coating 400 is powered off, the color-changing lampshade returns to a dark color, i.e., opaque.

In an embodiment, when the color-changing coating 400 is powered on, the color-changing lampshade becomes colorless, that is, transparent. When the color-changing coating 400 is not powered on, the visual effect of the color-changing lampshade is atomized, that is, opaque.

When the color-changing coating 400 is not powered, the color-changing lampshade is black when viewed from the front. When the light is turned on and the color-changing coating 400 is powered, the lampshade becomes transparent and the light can shine normally. When the light is turned off and the color-changing coating 400 is powered off, the color-changing lampshade turns back to black.

It is worth noting that the color of the color-changing coating 400 in the above-mentioned embodiments can be white, amber, brown or other colors or in an atomized state.

In this embodiment, an electrochromic film is used to form a color-changing coating 400. When the color-changing coating 400 is powered off, the electrochromic film presents a first color, such as opaque black; when the color-changing coating 400 is powered on, the electrochromic film presents a transparent color to meet the light color change requirements in the same usage scenario.

In an embodiment, the color-changing coating 400 is a thermosensitive color-changing layer.

It should be noted that the color-changing coating 400 is formed by spraying a thermochromic color-changing paint in the related art. The thermochromic color-changing paint is a microcapsule pigment that repeatedly changes color as the temperature rises and falls.

It should be understood that when the color-changing coating 400 is in different temperature environments, the color-changing coating 400 can show different colors to meet the color-changing requirements of the light in the same usage scenario.

Specifically, a black material that changes color when exposed to heat is electroplated on the substrate 300 to achieve a color-changing effect.

In an embodiment, the color-changing coating 400 is a photosensitive color-changing layer.

It should be noted that the color-changing coating 400 is a photochromic dye, such as ultraviolet sensitive paint, in the related art, so that the color-changing coating 400 can show different colors to meet the light color change requirements in the same usage scenario.

It should be understood that the color-changing coating 400 is formed by electroplating the photosensitive color-changing material on the substrate 300.

Specifically, by electroplating a non-light-absorbing black photosensitive color-changing material on the substrate 300, the substrate 300 is made to be one-way light-transmissive to achieve the color-changing effect. When the light is turned on, light can be transmitted from the substrate 300. Due to the change in the light transmission performance of the substrate 300, the printed circuit board assembly (PCBA) is also adjusted accordingly to achieve the required performance. When the light is turned off, the substrate 300 is black, and the interior of the color-changing lampshade cannot be seen, so as to improve the decorativeness of the color-changing lampshade.

In addition, based on the same technical concept, the present application also provides a lamp.

Figure 3:
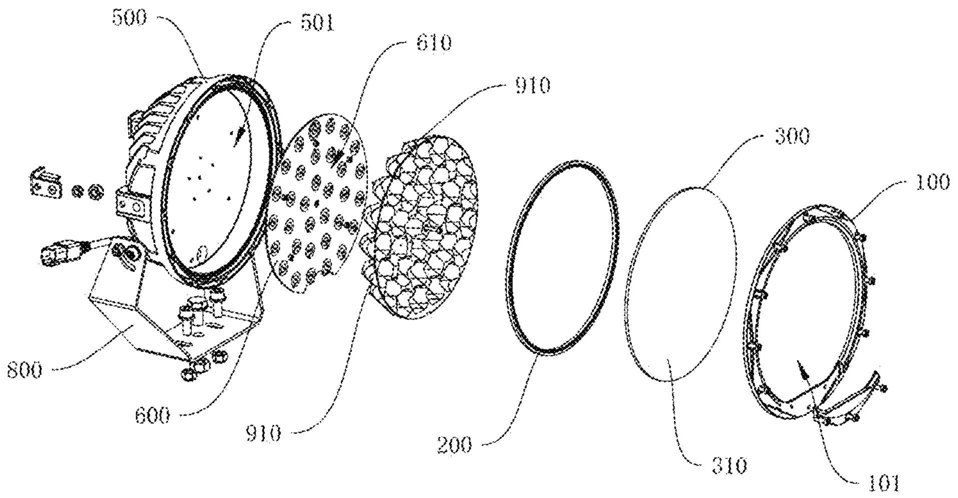
FIG. 3 is a schematic diagram of an exploded structure of a lamp according to an embodiment of the present application.
Figure 4:
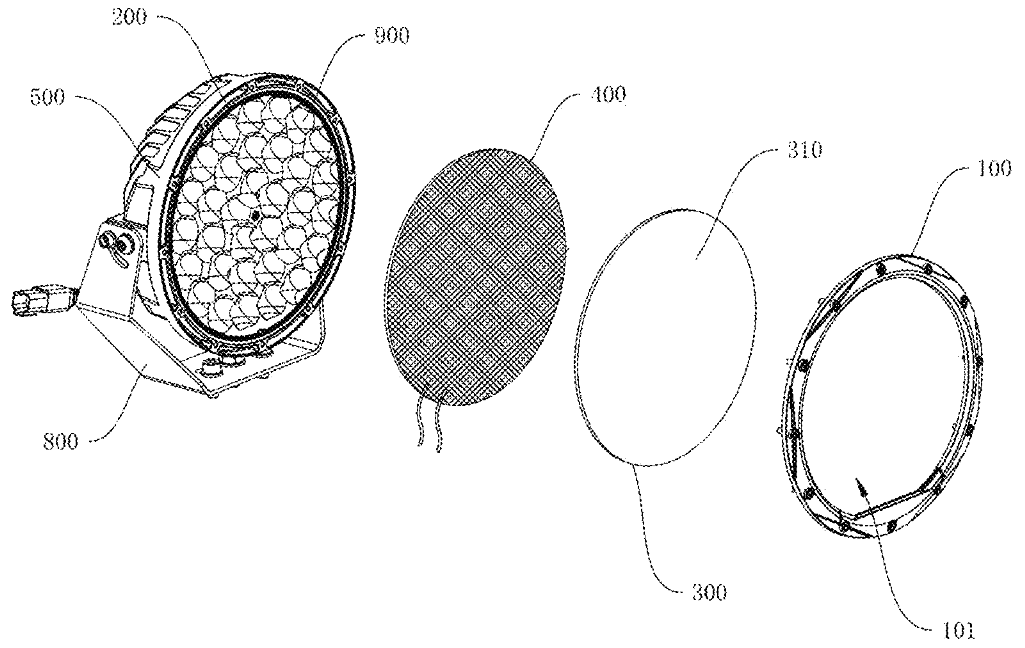
FIG. 4 is a schematic diagram of a structure of a color-changing coating according to an embodiment of the present application.

Continuing to refer to FIGS. 1 and 2, and to FIGS. 3 and 4, FIG. 3 is a schematic diagram of an exploded structure of a lamp according to an embodiment of the present application, and FIG. 4 is a schematic diagram of a structure of a color-changing coating according to an embodiment of the present application.

In an embodiment of the present application, as shown in FIGS. 1 to 4, a lamp includes a lamp body radiator 500, a light source 600 and a color-changing lampshade as described in the above embodiments. A mounting cavity 501 is formed in a recess on one side of the lamp body radiator 500, and the light source 600 is mounted in the mounting cavity 501. A light-emitting side 610 of the light source 600 is provided in a direction away from the lamp body radiator 500, and the upper cover 100 is detachably mounted on the lamp body radiator 500. The light outlet 101 is provided corresponding to the light-emitting side 610 of the light source 600. The waterproof ring 200 is provided on the lamp body radiator 500 along a periphery of the mounting cavity 501, and the substrate 300 is mounted on the mounting cavity 501 corresponding to the light-emitting side 610 of the light source 600. An outgoing light emitted from the light-emitting side 610 of the light source 600 passes through the color-changing coating 400 to form a color-changing light, and the color-changing light is emitted from the light outlet 101 through the substrate 300.

It should be noted that the specific structure of the color-changing lampshade refers to the above embodiments. Since the lamp adopts all the technical solutions of all the above embodiments, it at least has all the beneficial effects brought by the technical solutions of the above embodiments, which will not be described one by one here.

It should be understood that when the color-changing coating 400 in the color-changing lampshade is an electrochromic film in the related art, the main circuit in the lamp is composed of a control switch circuit, a signal recognition circuit, a drive circuit, a current control circuit, etc.

The method of controlling the switch circuit is: using a wave switch for control, turning it to position 1, the control switch circuit is connected; turning it to position 2, the control switch circuit is disconnected, and the color-changing coating 400 is powered on or off and changes color accordingly; or, using a rotary switch for control, rotating it to the left position, the control switch circuit is connected, rotating it to the right position, the control switch circuit is disconnected, and the color-changing coating 400 is powered on or off and changes color accordingly; or, using a sensor for control, when the sensor detects an external signal, it automatically outputs a signal, automatically starts the control switch circuit, automatically connects the control switch circuit, and the color-changing coating 400 is powered on or off and changes color accordingly; or, using an application (APP) for control, according to the actual application scenario and the actual road conditions, a command signal is output to the control switch circuit through the mobile phone APP to start and connect the control switch circuit, and the color-changing coating 400 is powered on or off and changes color accordingly.

The control switch circuit is used to issue control instructions according to the change requirements of the light color. The signal recognition circuit is used to identify/judge the received signal, identify the useful signal, and suppress the invalid signal. The drive circuit is used to provide a stable power supply, and supply a stable voltage/current to the light source 600 and the color-changing coating 400. The current control circuit is used to control and distribute the voltage/current provided by the power supply, and according to the instructions of the control switch circuit, control the appropriate voltage and current to be given to the color-changing coating 400, so that the color-changing coating 400 changes color accordingly.

It is worth noting that the color-changing coating 400 changes color according to the presence and magnitude of the voltage and current received. When there is no voltage/current, the glass is black; when the full voltage and current are received, the glass is transparent; and when the low voltage/low current is received, the glass is gray. According to the presence/magnitude of the voltage/current, the color-changing glass can switch between black, dark gray, light gray, pale gray, and transparent. The color-changing glass can also change to various colors according to different voltages and currents.

This embodiment uses the magnitude of the current to automatically change the color of the color-changing coating 400, change the light transmittance of the substrate 300, and thus change the intensity of light emitted from the substrate 300, thereby meeting different usage requirements of the lamp in various application scenarios.

In an embodiment, the upper cover 100 is detachably mounted on the lamp body radiator 500 by a plurality of bolts 700, and the plurality of bolts 700 are provided at intervals along a circumference of the upper cover 100.

In an embodiment, the light source 600 is a light emitting diode (LED) light panel.

It should be noted that in order to make the light source 600 stable, lightweight, easy to obtain and easy to assemble and disassemble, an LED light panel in the related art is used as the light source 600.

In an embodiment, in order to enable the lamp to adapt to different usage scenarios, the lamp further includes a bracket 800, and the lamp body radiator 500 is rotatably mounted on the bracket 800 through a rotating shaft.

In an embodiment, a lamp further includes a reflective component 900, which is mounted in the mounting cavity 501, and the reflective component 900 is provided between the light-emitting side 610 of the light source 600 and the substrate 300. The outgoing light emitted from the light-emitting side 610 of the light source 600 passes through the reflective component 900 to form a reflected light. The reflected light passes through the color-changing coating 400 to form a color-changing light, and the color-changing light passes through the substrate 300 and is emitted from the light outlet 101.

It should be noted that the function of the reflective component 900 is to increase the illumination and illumination area of the lamp, and to increase the coverage area of the color-changing light formed by the color-changing lampshade, thereby improving the actual use effect of the lamp and enhancing the user experience.

In an embodiment, the reflective component 900 includes a mounting plate and a plurality of reflective cups 910. The plurality of reflective cups 910 are distributed on the mounting plate, and the light-incoming end of each reflective cup 910 is provided toward the light-emitting side 610 of the light source 600.

It should be understood that in order to utilize limited light energy, the illumination distance and illumination area of the main light spot are controlled by the reflective cup 910, thereby improving the actual use effect of the lamp.

Finally, it should be noted that the serial numbers of the above embodiments of the present application are only for description and do not represent the advantages and disadvantages of the embodiments. The above embodiments are only optional embodiments of the present application, and do not limit the patent scope of the present application. All equivalent structures or equivalent process changes made by using the contents of the present application specification and drawings under the technical concept of the present application, or directly or indirectly applied in other related technical fields, are included in the patent protection scope of the present application.

What is claimed is:

1. A lamp, comprising:
- a lamp body radiator;
- a light source;
- a color-changing lampshade; and
- a circuit system, wherein:
- the color-changing lampshade comprises an upper cover enclosing a light outlet, a waterproof ring provided on and spaced from one side of the upper cover and extending along a periphery of the upper cover, a substrate being a transparent component and provided with a first side and a second side opposite to the first side, and a color-changing coating provided corresponding to a position of the light outlet and coated on the second side;
- the upper cover is configured to extend along a periphery of the substrate, lean against the first side, and press the substrate against one side of the waterproof ring;
- the color-changing coating is an electrochromic film configured to be opaque, dark or matte when not powered, and be transparent when powered;
- a mounting cavity is formed in a recess on one side of the lamp body radiator, and the light source is mounted in the mounting cavity;
- a light-emitting side of the light source is provided in a direction away from the lamp body radiator, and the upper cover is detachably mounted on the lamp body radiator;
- the light outlet is provided corresponding to the light-emitting side of the light source;
- the waterproof ring is provided on the lamp body radiator along a periphery of the mounting cavity, and the substrate is mounted on the mounting cavity corresponding to the light-emitting side of the light source;
- an outgoing light emitted from the light-emitting side of the light source passes through the color-changing coating to form a color-changing light, and the color-changing light is emitted from the light outlet through the substrate;
- the circuit system comprises a control switch circuit configured to generate a control signal according to a light color change requirement, a signal recognition circuit configured to recognize a valid control signal and suppress an invalid signal, a drive circuit configured to provide a stable voltage/current to the light source and the color-changing coating, and a current control circuit configured to adjust the voltage/current input to the color-changing coating according to the control signal of the control switch circuit; and
- a color change state of the color-changing coating is controlled by the presence and magnitude of an input voltage/current.

2. The lamp of claim 1, wherein the upper cover is detachably mounted on the lamp body radiator by a plurality of bolts, and the plurality of bolts are provided at intervals along a circumference of the upper cover.

3. The lamp of claim 1, wherein the light source is a light emitting diode (LED) light panel.

4. The lamp of claim 1, further comprising:
- a bracket, wherein the lamp body radiator is rotatably mounted on the bracket through a rotating shaft.

5. The lamp of claim 1, further comprising:
- a reflective component mounted in the mounting cavity and provided between the light-emitting side of the light source and the substrate;
- wherein the outgoing light emitted from the light-emitting side of the light source passes through the reflective component to form a reflected light;
- the reflected light passes through the color-changing coating to form the color-changing light; and
- the color-changing light passes through the substrate and is emitted from the light outlet.

6. The lamp of claim 5, wherein the reflective component comprises a mounting plate and a plurality of reflective cups distributed on the mounting plate, and a light-incoming end of each reflective cup is provided toward the light-emitting side of the light source.

* * * * *